(12) United States Patent
Hirst et al.

(10) Patent No.: US 7,387,278 B2
(45) Date of Patent: Jun. 17, 2008

(54) PARACHUTE RIPCORD PINS

(75) Inventors: David Richard Jordan Hirst, Bridgend (GB); Adrian Jones, Swanson (GB)

(73) Assignee: Airborne Systems Limited, Bridgend (GB)

( * ) Notice: Subject to any disclaimer, the term of this patent is extended or adjusted under 35 U.S.C. 154(b) by 0 days.

(21) Appl. No.: 11/185,727

(22) Filed: Jul. 21, 2005

(65) Prior Publication Data

US 2006/0038078 A1    Feb. 23, 2006

(30) Foreign Application Priority Data

Jul. 22, 2004    (GB) ................. 0416403.4

(51) Int. Cl.
*B64D 17/52*    (2006.01)
(52) U.S. Cl. .................................... 244/148
(58) Field of Classification Search .......... 244/152, 244/151 B, 149, 148, 147, 142
See application file for complete search history.

(56) References Cited

U.S. PATENT DOCUMENTS

| | | | | | |
|---|---|---|---|---|---|
| 2,398,692 | A | * | 4/1946 | Bratz | 244/149 |
| 2,824,481 | A | * | 2/1958 | Johnson | 411/8 |
| 2,919,085 | A | * | 12/1959 | Horning | 244/142 |
| 3,462,101 | A | * | 8/1969 | Chevrier | 244/148 |
| 3,830,453 | A | * | 8/1974 | Cannarozzo | 244/148 |
| 3,908,295 | A | * | 9/1975 | Dudley et al. | 40/669 |
| 3,913,770 | A | * | 10/1975 | Tarro | 215/223 |
| 4,170,138 | A | * | 10/1979 | Wiebe | 374/193 |
| 4,898,346 | A | * | 2/1990 | Ertler | 244/148 |
| 5,195,046 | A | * | 3/1993 | Gerardi et al. | 702/35 |
| 5,222,697 | A | * | 6/1993 | Allen | 244/149 |
| 6,626,400 | B1 | * | 9/2003 | Booth | 244/149 |

* cited by examiner

*Primary Examiner*—Tien Dinh
(74) *Attorney, Agent, or Firm*—Jacobson Holman PLLC

(57) ABSTRACT

Ripcord pins secure a parachute pack and, on removal, allow the parachute to be deployed from the pack. Such pins are provided with indicating means that provide an indication, such as a visual indication, that the pin has been bent. This avoids the re-use of straightened pins that may break in use.

19 Claims, 2 Drawing Sheets

PARACHUTE RIPCORD PINS

BACKGROUND TO THE INVENTION

1. Field of the Invention

The invention relates to parachute ripcord pins and to parachute packs incorporating such pins.

2. Discussion of the Prior Art

Prior to deployment, a parachute is held in a parachute pack closed by flaps held in place by a parachute ripcord pin or more than one such pin. The parachute ripcord pin or pins is/are connected to a ripcord which is pulled, either by a parachutist or by a static line or a pilot chute, to remove the pin(s), so allowing the pack to open and the parachute to deploy. After the parachute has been deployed, it may be refolded and repacked and the ripcord pin(s) reused to close the pack.

It is possible, in use, for a parachute ripcord pin to be deformed, for example, by being bent. It is known for those repacking parachutes to straighten such a deformed pin before reusing the pin. It is possible, however, for such deformation and straightening so to weaken the pin that, in use, the pin will break. This can happen when or before the ripcord is pulled, leaving the pin in the pack and, plainly, the consequences of this are potentially very dangerous.

SUMMARY OF THE INVENTION

According to a first aspect of the invention, there is provided a parachute ripcord pin for holding a parachute pack closed, removal of the ripcord pin allowing the pack to open and deploy the parachute, the pin including means for providing an indication when the blade has been deformed.

According to a second aspect of the invention, there is provided a parachute pack for containing a parachute, the parachute pack being closed by a ripcord pin according to the first aspect of the invention.

According to a third aspect of the invention, there is provided a parachute pack according to the second aspect of the invention and containing a packed parachute.

In this specification, references to a "parachute" are references to any form of parachute including parachutes for persons, parachutes for loads, pilot parachutes and reserve parachutes or a combination of the above.

The following is a more detailed description of an embodiment of the invention, by way of example, reference being made to the accompanying drawings in which:

DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
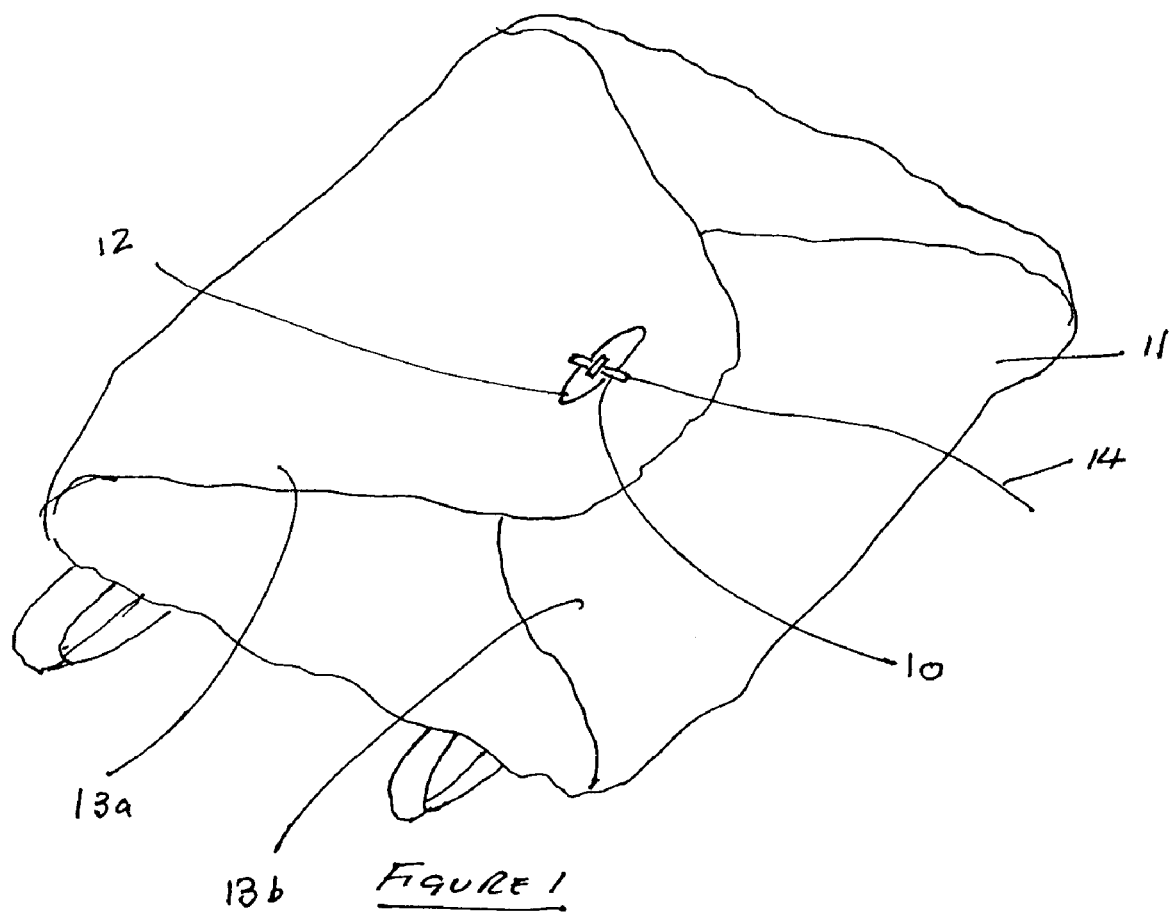
FIG. 1 is a schematic view of a parachute pack closed by a single ripcord pin.

Referring first to FIG. 1, a ripcord pin holds closed a parachute pack indicated schematically at 11 containing a folded parachute and, optionally, a spring loaded drogue parachute. The ripcord pin 10 may, for example, extend through an eyelet 12 provided on a first flap 13a of the pack 11 and extend through a hole in a second flap 13b to hold the flaps 13a, 13b closed. The ripcord pin 10 is connected to a ripcord 14 that can be pulled either by a person carrying the parachute or by a static line or pilot chute to remove the ripcord pin 10 from the eyelet 12 and so allow the flaps 13a, 13b to open and release the parachute. Where a spring loaded drogue parachute is provided, the drogue is first released and then draws the main parachute out of the pack 11.

Figure 2:
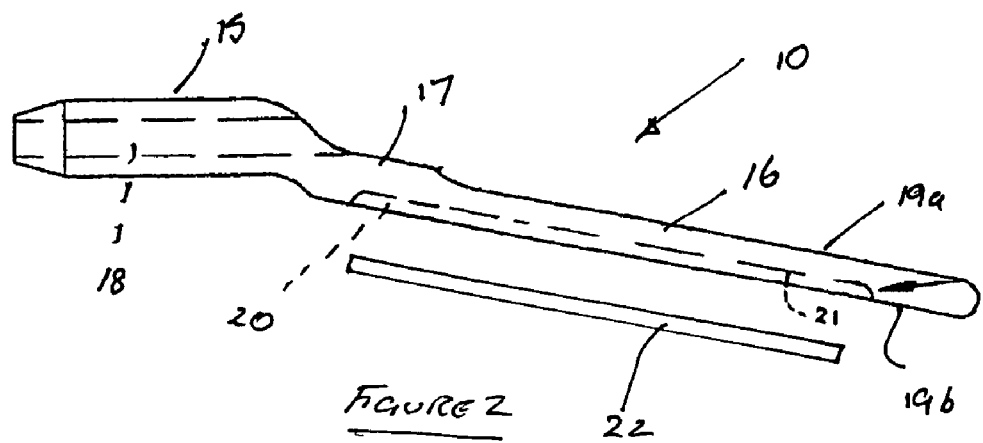
FIG. 2 is a side elevation of the ripcord pin of FIG. 1.
Figure 3:
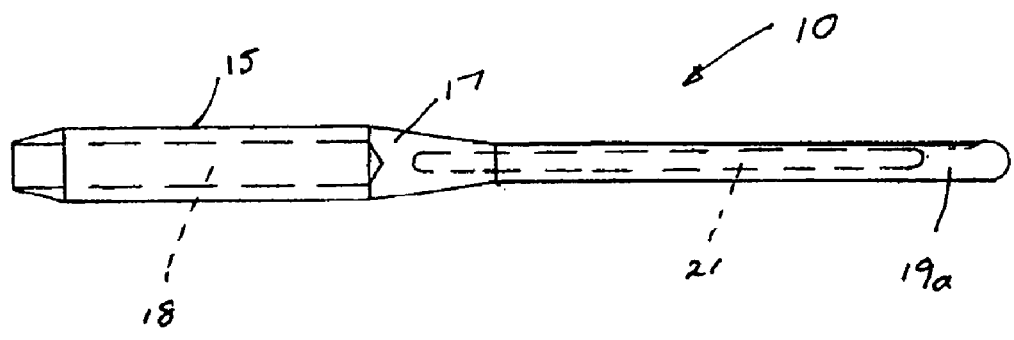
FIG. 3 is a view from above of the ripcord pin of FIG. 2.

Referring now to FIG. 2, the ripcord pin is formed from metal, although it may be formed from any other suitable material. The ripcord pin 10 has a body 15 and a blade 16 connected by a shoulder 17. The body 15 is generally cylindrical in shape and includes a passage 18 which receives an end of the ripcord 14 to connect the ripcord 14 to the pin 10. The blade 16 is narrower than the body 15 and is connected to the body 15 by the shoulder 17. The blade 16 is inclined at an acute angle to the body 15.

The blade 16 has first and second opposed surfaces 19a, 19b. The second surface 19b is provided with an elongate groove 20. The groove 20 is machined into the blade 16 and contains means for providing an indication when the blade has been deformed. There are a number of ways in which this can be achieved and some examples are as follows.

First, the groove 20 can be filled with a brittle material such as a cellulose paint 21 that will fracture if the blade 16 is deformed. Alternatively, a ceramic rod 22 can be bonded into the groove 20 and will break if the blade 16 is deformed.

Figure 4:
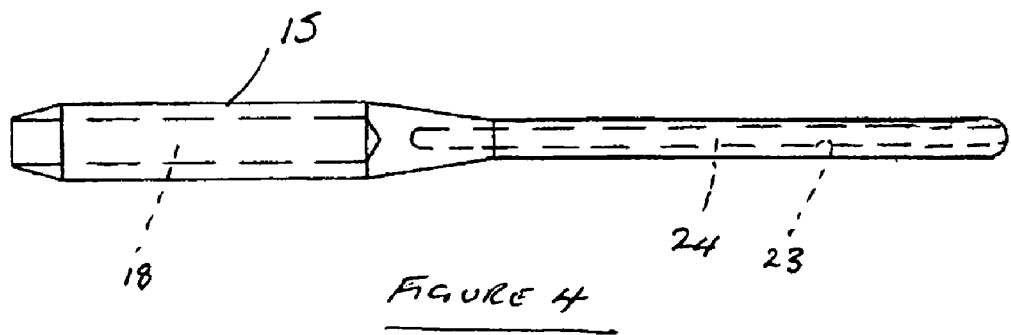
FIG. 4 is a similar view to FIG. 3 but showing alternative embodiment of the ripcord pin.

An alternative is shown in FIG. 4. In this embodiment, the groove 20 is omitted and the blade 16 provided with a longitudinal bore 23. A sealed glass tube 24 containing dye is inserted into the bore 23 so that, if the blade 16 is deformed, the glass tube 24 will break and the dye will be released.

Accordingly, all the ripcord pins described above with reference to the drawings provide a visual indication when the blade 16 has been deformed. This is important because ripcord pins are reused and, occasionally, in use, such pins are bent. There has previously been the possibility of such a bent pin being straightened and then re-used but this can cause the pin 10 to be so weakened that when the ripcord 14 is pulled, the pin 10 will break and, in this circumstance, the blade 16 may be left in the eyelet 12 so that the pack 11 does not open. This has potentially very serious consequences. The visual indication described above with reference to the drawings makes it apparent immediately when a pin 10 has been deformed and so the pin can then be discarded.

It will be appreciated that there are a number of variations that can be made to the pin 10 described above with reference to the drawings. The pin 10 need not be formed by a body 15, blade 16 and shoulder 17. It could have any configuration. While the indication means described above with reference to the drawings provide a visual indication, this need not be the case. Indication means could provide an electronically readable indication of pin deformation by providing, for example, a detectable change in the value of a resistance when the pin 10 has been deformed.

The invention claimed is:

1. A parachute ripcord pin for holding a parachute pack closed, removal of the ripcord pin allowing the pack to open for deployment of a parachute in said pack, the pin having a ceramic rod mounted thereto to provide a visual indication when the pin has been deformed, said ceramic rod being unfractured in a first state when the pin is undeformed and being fractured in a second state when the pin has been deformed.

2. The ripcord pin according to claim 1 wherein the ceramic rod is bonded to the pin.

3. The ripcord pin according to claim 1 wherein the pin includes an elongate groove extending along the length of the pin, the ceramic rod being located in said groove.

4. The ripcord pin according to claim 1 wherein the pin is formed by a body for connection to a ripcord and a blade extending away from the body, the ceramic rod being associated with the blade.

5. A parachute pack for containing a parachute, the parachute pack being closed by a ripcord pin or pins according to claim 1.

6. A parachute pack according to claim 5 and containing a packed parachute.

7. A parachute ripcord pin for holding a parachute pack closed, removal of the ripcord pin allowing the pack to open for deployment of a parachute in said pack, the pin comprising a body and a blade having an elongate groove extending along the length thereof and an indication element located in said groove for providing an indication when the pin has been deformed.

8. The parachute ripcord pin according to claim 7, wherein the indication element is an elongate member that fractures when the pin has been deformed.

9. The parachute ripcord pin according to claim 8, wherein the indication element is a ceramic rod.

10. A parachute ripcord pin for holding a parachute pack closed, removal of the ripcord pin allowing the pack to open for deployment of a parachute in said pack, the pin comprising a body for connection to a ripcord and a blade extending away from the body, said pin including an indication element substantially mounted within said blade for providing an indication when the pin has been deformed.

11. The ripcord pin according to claim 10 wherein said indication element is an elongate member of brittle material.

12. The ripcord pin according to claim 11 wherein the elongate member of brittle material is a ceramic rod.

13. The ripcord pin according to claim 12 wherein the ceramic rod is bonded to the pin.

14. The ripcord pin according to claim 10 wherein the blade includes an elongate groove, said indication element being located in said groove.

15. The ripcord pin according to claim 10 wherein the indication element is inserted within a bore of said blade.

16. The ripcord pin according to claim 15 wherein the indication element includes a glass tube with a dye contained therein that is released when the pin is deformed.

17. A parachute ripcord pin for holding a parachute pack closed, removal of the ripcord pin allowing the pack to open for deployment of a parachute in said pack, the pin having a separate elongate member of brittle material substantially mounted within said pin that provides a visual indication when the pin has been deformed, said elongate member being unfractured in a first state when the pin is undeformed and being fractured in a second state when the pin has been deformed.

18. The ripcord pin according to claim 17 wherein the elongate member includes a glass tube with a dye contained within said pin, the dye being released when the pin is deformed.

19. A parachute ripcord pin for holding a parachute pack closed, removal of the ripcord pin allowing the pack to open for deployment of a parachute in said pack, the pin including a glass tube with a dye contained in the tube that is released to provide a visual indication when the pin has been deformed, said elongate member being unfractured in a first state when the pin is undeformed and being fractured in a second state when the pin has been deformed.

* * * * *